United States Patent
King (10) Patent No.: US 8,223,990 B1
(45) Date of Patent: Jul. 17, 2012

(54) AUDIO NOISE ATTENUATION

(75) Inventor: Brian King, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 904 days.

(21) Appl. No.: 12/234,542

(22) Filed: Sep. 19, 2008

(51) Int. Cl.
*H04B 15/00* (2006.01)

(52) U.S. Cl. ....... 381/94.3; 381/92; 381/94.2; 381/94.1; 381/94.7

(58) Field of Classification Search ................. 381/94.3, 381/94.1, 94.2, 94.7, 92, 122
See application file for complete search history.

(56) References Cited

U.S. PATENT DOCUMENTS

2003/0147538 A1* 8/2003 Elko ................................ 381/92
2009/0002498 A1* 1/2009 Oku .......................... 348/207.99

* cited by examiner

*Primary Examiner* — Long Pham
(74) *Attorney, Agent, or Firm* — Fish & Richardson P.C.

(57) ABSTRACT

This specification describes technologies relating to editing digital audio data. In general, one aspect of the subject matter described in this specification can be embodied in methods that include the actions of receiving an audio signal including audio data in multiple channels; identifying noise in the audio signal including identifying panning information for the audio data in the signal at each of multiple frequency bands; and attenuating the audio data at one or more frequency bands to generate an edited audio signal when the panning exceeds a specified threshold for each of the one or more frequency bands. Other embodiments of this aspect include corresponding systems, apparatus, and computer program products.

36 Claims, 7 Drawing Sheets

AUDIO NOISE ATTENUATION

BACKGROUND

The present disclosure relates to editing digital audio data.

Audio signals including audio data can be provided by a multitude of audio sources. Examples include audio signals from an FM radio receiver, a compact disc drive playing an audio CD, a microphone, or audio circuitry of a personal computer (e.g., during playback of an audio file).

A microphone provides an audio signal by capturing audio (e.g., a person's voice or an instrument). In particular, the microphone converts sound into an audio signal using a transducer. For example, the microphone can include a thin membrane that vibrates in response to sound waves. The vibrations are then converted into electrical signal. Microphones have directionality. Directionality refers to a sensitivity to sounds received by the microphone from different directions. For example, an omnidirectional microphone is theoretically equally sensitive from all directions while a unidirectional microphone is sensitive over a narrow angular range.

Multiple microphones can be used to capture audio including capturing the same audio or to capture different audio (e.g., different musical instruments). For example, an person giving a speech may have multiple microphones positioned in front of them (e.g., on a podium), where each microphone is used to capture the person's voice.

The audio signal can be processed, including edited, for example using a digital audio workstation. The digital audio workstation can include tools for editing, mixing, and displaying properties of audio signals. The editing can include, for example, amplifying or attenuating particular portions of the audio signal.

Noise can interfere with the capture of audio, for example, by masking other sounds, (e.g., a speakers voice), by generating unpleasant sounds that overlap with the speaker's voice. One type of noise is wind noise. Wind noise is typically generated based on wind blowing across a microphone. The wind noise can be variable in both intensity and duration. The microphone can capture this wind noise along with the desired audio. Consequently, the presence of wind noise in an audio signal can interfere with or mask the desired audio (e.g., a speaker's voice).

SUMMARY

This specification describes technologies relating to editing digital audio data.

In general, one aspect of the subject matter described in this specification can be embodied in methods that include the actions of receiving an audio signal including audio data in multiple channels; identifying noise in the audio signal including identifying panning information for the audio data in the signal at each of multiple frequency bands; and attenuating the audio data at one or more frequency bands to generate an edited audio signal when the panning exceeds a specified threshold for each of the one or more frequency bands. Other embodiments of this aspect include corresponding systems, apparatus, and computer program products.

These and other embodiments can optionally include one or more of the following features. Identifying the noise includes identifying noise for each of multiple segments of the audio signal. For each segment: dividing the audio data of the audio signal into the multiple frequency bands; calculating a panning percentage for each frequency band based on a measured intensity of audio data in the frequency band for each channel of the multiple channels; and filtering the audio data of the segment. The filtering includes determining filter parameters for each segment that attenuates frequency bands having panning that exceeds the specified threshold and applying the filter to the audio data. The multiple segments are partially overlapping in the time-domain.

The multiple channels includes a left audio channel and a right audio channel providing a stereo audio signal. The identified noise is wind noise. The multiple frequency bands are frequency bands having frequencies less than or equal to a corner frequency. Attenuating the audio data at a particular frequency band includes smoothing attenuation at the boundaries of the particular frequency band. The method further includes displaying a visual representation of the audio signal; and receiving an input selecting a portion of the visual representation corresponding to audio data to edit. The method further includes storing the edited audio signal. The edited audio signal is generated as the audio signal is being received from an audio capture device.

Particular embodiments of the subject matter described in this specification can be implemented to realize one or more of the following advantages. Audio quality is improved by reducing or removing wind noise. The techniques for identifying and removing wind noise do not require additional hardware to implement. Attenuating wind noises with a high perceived loudness increases listenability and reduces listener fatigue. Also, hearing damage can occur to listeners with noise like this, which is unpredictable and can be very loud. Therefore, removing the noise can protect people's hearing.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
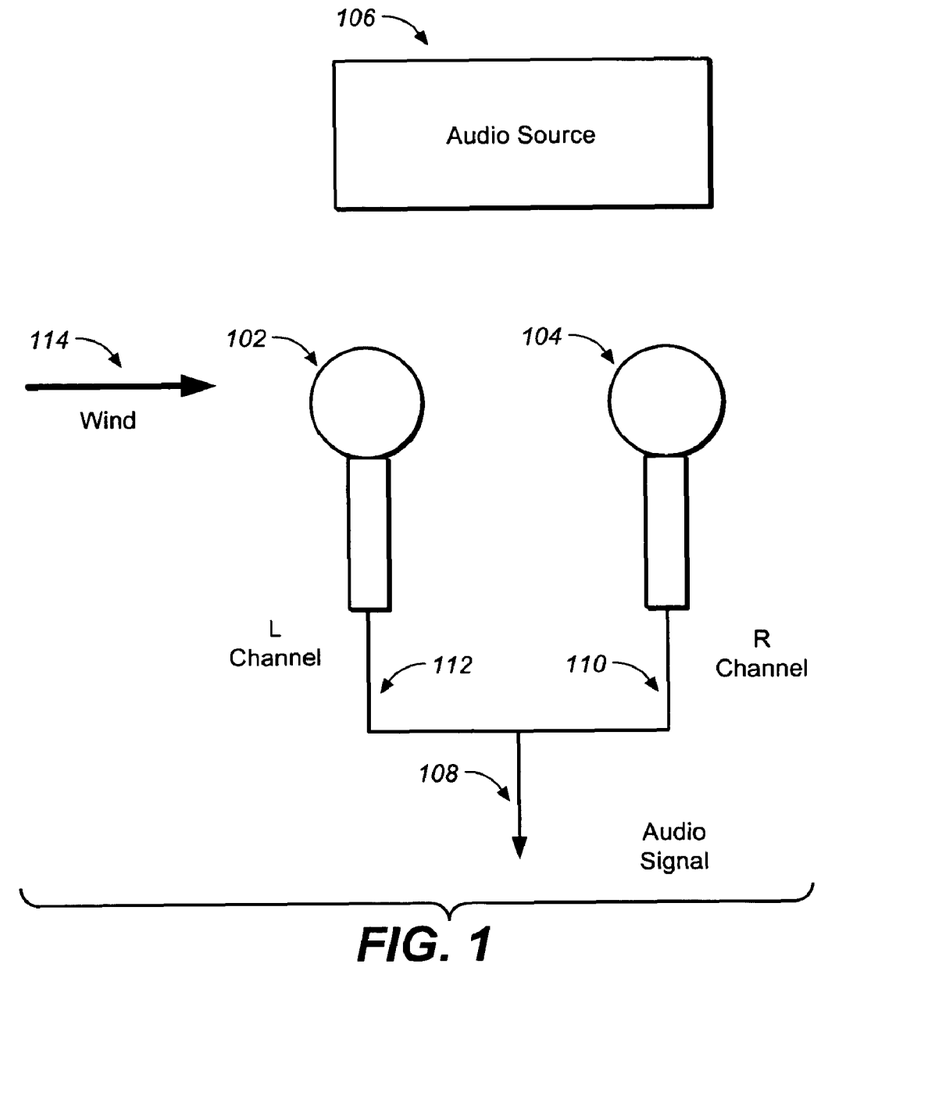
FIG. 1 is a block diagram of an example of capturing a multi-channel audio signal from an audio source.

FIG. 1 is a block diagram of an example of capturing a multi-channel audio signal from an audio source. In particular, FIG. 1 shows an audio source 106 along with a first microphone 102 and a second microphone 104. The audio source 106 can be, for example, one or more individuals, musical instruments, or other sound producing entities or objects. Both the first microphone 102 and the second microphone 104 are positioned to capture audio from the audio source 106. For example, the microphones and audio source can represent an individual speaking in front of a pair of microphones.

In the example of FIG. 1, each microphone captures audio associated with a distinct audio channel. In particular, microphone 102 captures audio for a left audio channel 110 and microphone 104 captures audio for a right audio channel 112 (e.g., to form a stereo audio signal). The resultant audio signal 108, therefore, includes audio data from both the left audio channel 110 and the right audio channel 112.

Additionally, wind 114 is blowing from the left side toward the first and second microphones 102 and 104, respectively. Thus, the noise generated by the wind 114 will be perceived as occurring from the left (i.e., panned to the left). Also, the intensity of the wind 114 captured can have a greater magnitude in the first microphone 102 as compared with the second microphone 104 because of their relative positions.

Figure 2:
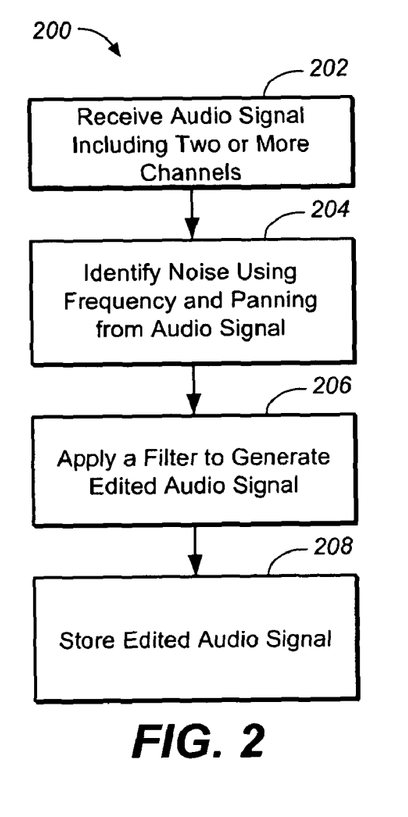
FIG. 2 is a flowchart of an example process for removing noise from an audio signal.

FIG. 2 is a flowchart of an example process 200 for removing noise from an audio signal. For convenience, the process 200 will be described with respect to a system that performs the process 200.

The system receives 202 an audio signal including two or more channels. Audio signals can be received from an FM radio receiver, a compact disc drive playing an audio CD, a microphone, or audio circuitry of a personal computer (e.g., during playback of an audio file, for example, a WAV, AIFF, AU, WMA, or MP3 file). Audio signals can have different properties, including signal intensity, signal kind (e.g., stereo, mono), stereo width, phase (or phase correlation, e.g., of a stereo signal), as well as panning (or balance).

The audio signal can be received from an audio capture device while the signal is being captured (e.g., a "live" capture from one or more microphones) or as a previously captured audio signal (e.g., as an audio file stored locally or remotely). In either scenario the audio signal includes two or more channels. Channels represent distinct streams of audio data. A channel can be generated by converting a particular analog input from a microphone into an audio signal, (e.g., as digital samples generated using a digital-analog converter). For example, audio captured from left and right microphones can correspond to the left and right channels, respectively.

The system identifies 204 noise from analysis of one or more segments of the multi-channel audio signal using frequency and panning information. The identified noise can be, for example, wind noise. In particular, the wind noise can originate from a direction that is panned to one side of the audio capture devices (e.g., to a side of the microphones). Additionally, the wind noise can have a particular frequency range. Thus, the system uses panning and frequency information to identify noise in the audio signal.

In some implementations, the audio signal is divided into multiple segments, each having a specified time duration, e.g., fifty milliseconds. The segments are then each processed to identify the presence of noise in that segment. Alternatively, in some other implementations, a single segment composed of the entire duration of the audio signal is analyzed.

The system applies 206 filtering to the audio signal to generate an edited audio signal. In particular, the system applies a particular filter to each segment identified as having noise to generate an edited audio segment. The filter can be used to attenuate audio data of a given segment associated with one or more frequency bands. The system can specify filter parameters according to the particular noise identified for the segment. The attenuation can be performed to reduce or eliminate the identified noise, e.g., wind noise. Generating and applying a filter to a given segment is described in greater detail below with respect to FIG. 3.

The system combines 208 segments (edited or not depending on whether the filter was applied to the particular segment) to generate an edited audio signal. In some implementations, each segment is consecutive such that the edited audio signal is generated simply by stringing the segments together. Alternatively, in some other implementations, the audio signal is divided into overlapping segments. For example, each segment can overlap the previous segment by some portion (e.g., by one-half). The overlapping portions can be combined when combining the segments. The segments can be overlapped, for example, to compensate for reduced accuracy at segment edges when processed using Fourier transforms (e.g., to identify particular frequency bands), as described below with respect to FIG. 3.

The system stores 208 the edited audio signal (e.g., for later processing or playback). Additionally, the edited audio signal can be output for playback, further processing, editing in the digital audio workstation, saving as a single file locally or remotely, or transmitting or streaming to another location. Additionally, the edited audio signal can be displayed, for example, using a visual representation of the audio data e.g., an amplitude waveform, frequency spectrogram, or pan position representation.

Figure 3:
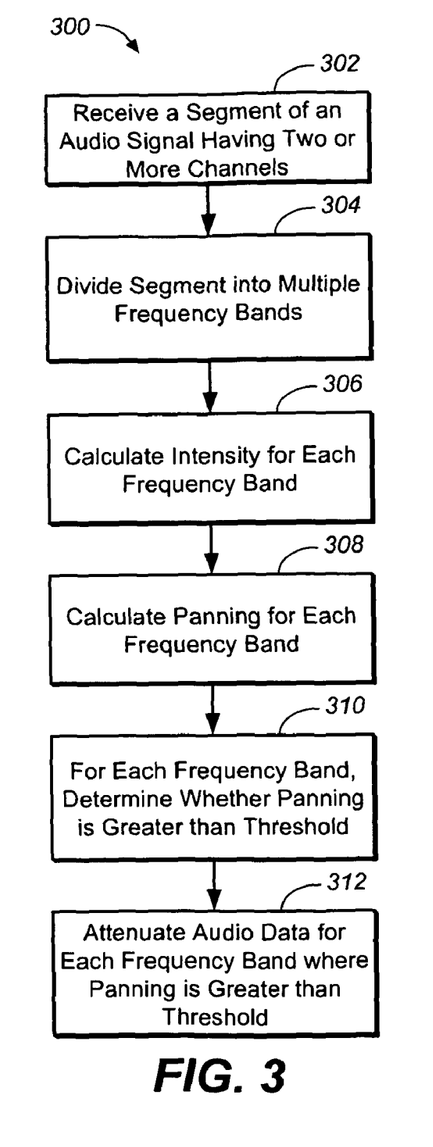
FIG. 3 is a flowchart of an example process for identifying and attenuating noise in an audio signal.

FIG. 3 is a flowchart of an example process 300 for identifying and attenuating noise (e.g., wind noise) in an audio signal. For convenience, the process 300 will be described with respect to a system that performs the process 300.

The system receives 302 a segment of the audio signal having two or more channels. For convenience, the process is described with reference to two channels of a stereo audio signal. However, the process is applicable to multi-channel audio generally.

The audio signal is divided into segments of a specified length (i.e., a specified duration in time). For example, the length of each segment can be specified by a particular number of samples at a given sample rate. Alternatively, the system can specify a number of samples and a sample rate to provide segments of a particular segment length. For example, in some implementations, each segment has a length of fifty milliseconds. For a particular sample rate of 44.1 kHz, this is equivalent to 2048 samples.

Each segment, including both stereo channels, is processed. For example, each segment can first be received at a buffer for processing separate segments of the audio signal. In some implementations, the segment is zero-padded to increase the sample size of the segment. For example, a zero-pad can be performed to double the sample size to 4096 samples. The zero-padding is added to the end of the segment in order to prevent or reduce time aliasing of a filtered signal.

The system divides 304 the segment into multiple frequency bands. In particular, a Fourier transform (e.g., a fast Fourier transform (FFT)) can be used to convert the audio data of the segment from a time-domain to a frequency domain. The FFT extracts frequency components of the audio data in the segment. In particular, the FFT separates individual frequency components of the audio data from zero hertz to the Nyquist frequency. Each frequency band covers a portion of the frequency spectra, for example, from 0 Hz to 22,050 Hz. In some implementations, each frequency band has a range covering an equal number of frequencies. For example, each frequency band can cover a frequency range of 100 Hz. In other implementations, however, the size of the frequency bands can vary (e.g., more frequency bands covering a frequency range of interest where particular noise is likely to occur). Thus, the system can more finely process those frequencies.

In some implementations, the system ignores frequency bands above a threshold frequency. For example, a corner frequency (or cutoff frequency) can be specified for particular types of target noise. Thus, if wind noise occurs at frequencies below 1000 Hz, the system can limit the processing to frequency bands at or below this cutoff frequency. Other noise types can be associated with different frequency ranges such that different frequency cutoffs or frequency floors can be specified. Identifying frequency cutoffs can reduce the amount of processing of the audio signal.

The system calculates 306 the intensity for each channel of the segment for each frequency band. Thus, each frequency band of the segment has a corresponding intensity value (e.g., an average intensity for the audio data within the frequency band over a fifty millisecond segment length). In some implementations, the system measures intensity within a particular frequency band for a specified number of points over the length of the segment (e.g., at a specified sampling rate), the values of which can be averaged to calculate the average intensity for that frequency band.

For example, for a frequency band from 100 Hz to 200 Hz, the system can calculate an FFT that separates the audio data of the audio signal within that frequency band. The system can then calculate intensity values for discrete points in the audio signal (e.g., every millisecond for the entire length of the segment). Calculating an average intensity can include summing the intensity for each point and dividing by the number of discrete points. The points can be particular samples according to a specified sampling rate over the entire duration of the segment.

In an alternative example, the system can use one or more filters to separate the audio data of each segment into particular frequency bands in place of FFTs. For example, a band pass filter can be tuned to each frequency band in order to isolate the audio data of the audio segment by frequency. The intensity for each frequency band can then be calculated as described above.

The system calculates 308 the panning for the audio data in the segment. In particular, the intensity of the audio data for each frequency band in each channel is used to calculate a panning percentage (e.g., a particular angle relative a center panning) associated with the audio from that segment. The panning percentage can be calculated, for example, as:

$$pan\% = \begin{cases} 100\left(1 - \frac{|X_L(f)|}{|X_R(f)|}\right), & |X_R(f)| \geq |X_L(f)| \\ -100\left(1 - \frac{|X_R(f)|}{|X_L(f)|}\right), & |X_R(f)| < |X_L(f)| \end{cases}.$$

Where $X_L(f)$ represents the intensity value for the left channel of the segment for a particular frequency band (f) and where $X_R(f)$ represents the intensity value for the right channel of the segment for a particular frequency band (f). Thus, when the intensity of the right channel is greater than or equal to the intensity of the left channel, the panning percentage is a function of the left channel intensity divided by the right channel intensity. Similarly, when the intensity of the left channel is greater than the intensity of the right channel, the panning percentage is a function of the right channel intensity divided by the left channel intensity. For a given frequency band, a positive panning value indicates segment audio data panned to the right, while a negative value indicates segment audio data panned to the left. For example, if the intensity of the left channel is twice as great as the intensity of the right channel, the panning percentage is 50% to the left of center.

For each frequency band, the system determines 310 whether the calculated panning is greater than a specified threshold amount. The audio data of a particular frequency band is considered to include noise when the calculated panning percentage is greater than the threshold. The threshold amount can be a default value or user specified. For example, the panning threshold percentage can be 30% to either the left or right of center. The threshold amount is selected to reduce the likelihood that non-noise audio data will be identified as noise while still identifying the noise.

The system filters 312 the segment by attenuating audio data for each frequency band where the panning is greater than the threshold. The attenuation is performed for all of the audio data corresponding to the given frequency band in the segment. The attenuation amount can be a specified fixed amount (e.g., by 10 dB), an amount proportional to the intensity at the frequency band (e.g., reduce by 75%), or a complete attenuation (e.g., where 0 dB is no attenuation and negative infinity dB is maximum attenuation.).

Various filtering techniques can be used to attenuate audio data at different frequency bands. For example, combinations of high-pass, low-pass, and band-pass filters can be used to isolate and attenuate particular frequencies in the audio data of the segment. The segment and the filter can be converted back into the time-domain before applying the filter (e.g., convolving the segment audio data with the filter in the time-domain).

In some implementations, a filter is constructed in the frequency domain to filter the segment according to frequency band. For example, filter parameters can be specified such that each frequency band is assigned a value or 1 or 0. Frequency bands assigned a value of 1 are unchanged while frequency bands assigned a value of 0 are attenuated. In particular, in some implementations, all frequency bands above the corner frequency are automatically assigned a value of 1. Additionally, all frequency bands having a panning percentage that is less than or equal to the threshold value are also assigned a value of 1. However, frequency bands having a panning percentage that is greater than the threshold value are assigned a value of 0. Thus, only those frequency bands with identified noise are subject to attenuation by the filter.

For example, if a given segment has been divided into ten frequency bands, with five above the corner frequency, and the third, fourth, and fifth frequency bands have a panning that is greater than the threshold, the assigned filter values would be 1 1 0 0 0 1 1 1 1 1 to represent the action to be taken by the filter for each frequency band.

In some implementations, a large sequence can be interrupted by a single contrary value. If, in the previous example, only the fourth frequency band had a panning that was greater than the threshold, then it would represent the only zero in a long sequence of filter values, e.g., 1 1 1 0 1 1 1 1 1 1. A single zero surrounded by ones, or a single one surrounded by zeros, can generate artifacts when played. In particular, a "musical note" artifact can result that produces short bursts as specific tones. As a result, the system can change the value of these outliers to match the filter values of the surrounding frequency bands. Thus, in the above example, the single zero would be changed to a one. Consequently, the artifacts can be decrease and the noise attenuation improved. In some implementations, the outlier values are changed using a third-order median filter or other technique.

Applying the filter to the audio data of the segment in the frequency-domain includes multiplying the filter by the audio data to generate filtered frequency-domain values for the segment.

After filtering the audio data in the frequency-domain, the system performs an inverse Fourier transform on the audio data of the segment. The inverse Fourier transform converts the audio data of the segment from the frequency-domain back to the time-domain. As a result, the system generates a time-domain edited segment. The edited segment can then be combined with other processed segments to generate an edited audio signal, as described above in FIG. 1.

In some other implementations, the attenuation can produce sharp steps, or discontinuities, in the audio data, particularly at the corner frequency. This can generate audio artifacts noticeable by users during playback of the audio signal. Smoothing techniques can be employed to ease the transition from attenuated audio data to non-attenuated audio data. For example, near the frequency band boundaries, the attenuation can be gradually decreasing in order to smooth the edges of the audio data.

In some implementations, a user can interact with a visual representation of the audio signal in order to identify a portion of the audio signal to be filtered. Different visual representations of audio data are commonly used to display different features of the audio data. For example, an amplitude waveform display shows a representation of audio intensity in the time-domain (e.g., a graphical display with time on the x-axis and intensity on the y-axis). Similarly, a frequency spectrogram shows a representation of frequencies of the audio data in the time-domain (e.g., a graphical display with time on the x-axis and frequency on the y-axis). A portion of the audio data shown in the visual representation can depend on a scale or zoom level of the visual representation within a particular interface.

In one example, a visual representation of pan position can show the pan position of audio data in the audio signal in the time-domain. The pan position indicates the spatial location of particular audio data at any given time in terms of relative displacement to the left or right of center. In the pan position representation, a displacement axis shows the relative displacement of particular components of the audio data to the right or the left of center as a percentage to the left or right from 0 to 100 (or −100). Thus, at any particular point in time, the audio data can include multiple different pan positions indicating audio data at various spatial locations. In some implementations, the pan position representation can further represent one or more other features of the associated audio data. For example frequency can be represented in according to a color of the representation. For example, higher frequencies can be represented by colors on the red end of the visible spectrum while low frequencies can be represented by colors on the blue end of the visible spectrum. Alternatively, the brightness of the representation can vary to indicate intensity (e.g., brighter the color, the higher the intensity).

The system can display parameters associated with the filtering operation with which the user can interact. For example, the corner frequency can be displayed within a frequency spectrogram (e.g., as a line at the corner frequency or other visual indicator). The user can modify the corner frequency, for example, by changing or selection a frequency value or by dragging the visual indicator of the corner frequency to a different location. Additionally, the visual representation of the audio signal can also indicate the portion of the audio signal to be filtered. For example, by highlighting the portions of the audio signal to be filtered given the particular corner frequency and panning threshold. In some implementations, a filtered version of the audio signal can be presented to the user for review and can also be undone by the user (e.g., by selecting an undo menu item).

Figure 4A:
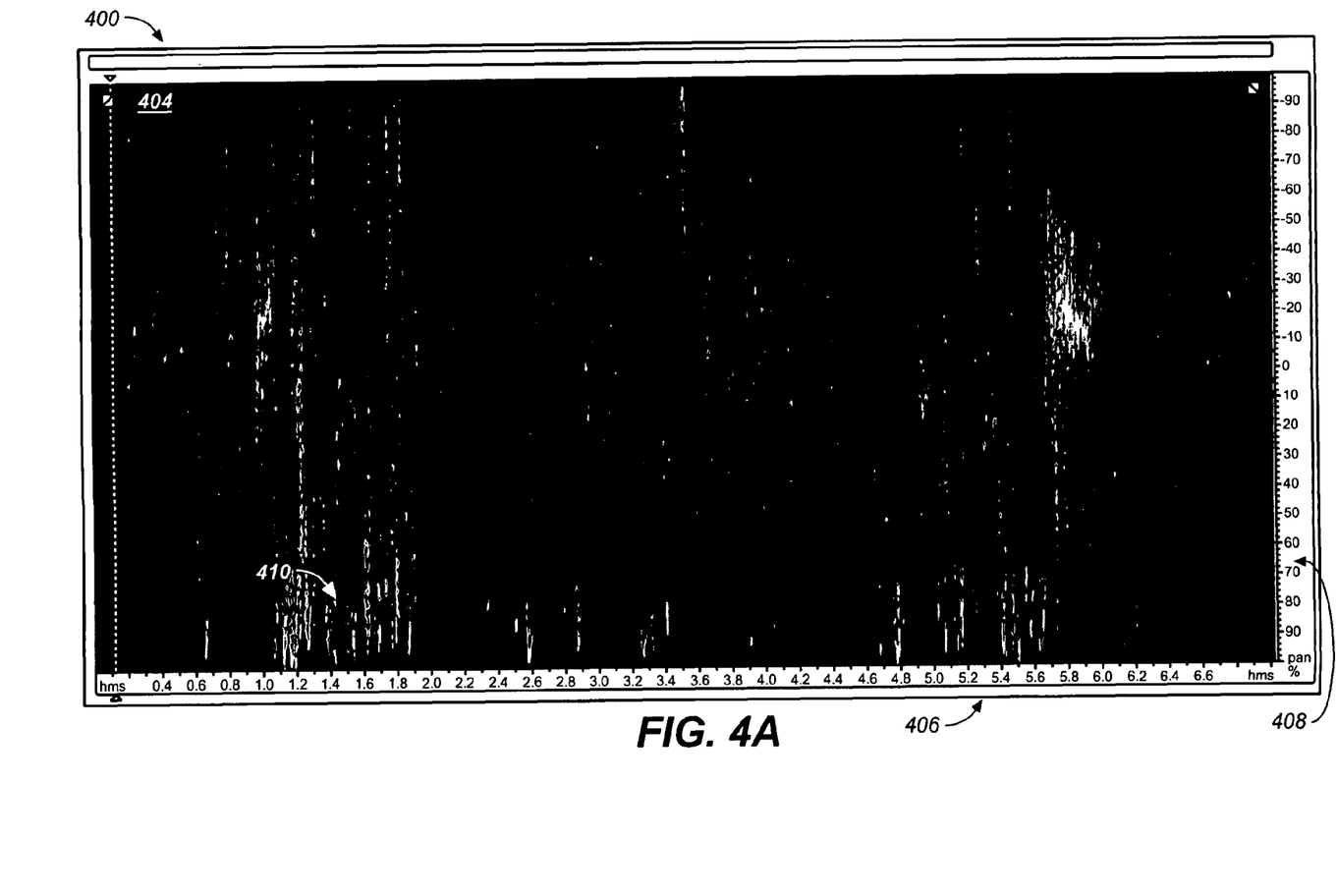
FIG. 4A shows a display of an example pan position representation of an audio signal including wind noise.

FIG. 4A shows a display 400 of an example pan position representation 404 of an audio signal including wind noise 410. The display 400 shows pan position on the y-axis 408 as a percentage to the left or right of center and time on the x-axis 406 in seconds. The pan position representation 404 shows the spatial location of audio data within the audio signal relative to a center point. Audio data located to the left of center has a negative pan position while audio data located to the right of center has a positive pan position in the pan position representation 404. In particular, the pan position representation 404 shows audio data panned far to the right representing wind noise 410 (e.g., having a panning percentage greater than 40%). Thus, the audio data representing the wind noise is panned far to the side relative to the other audio data of the audio signal.

Figure 4B:
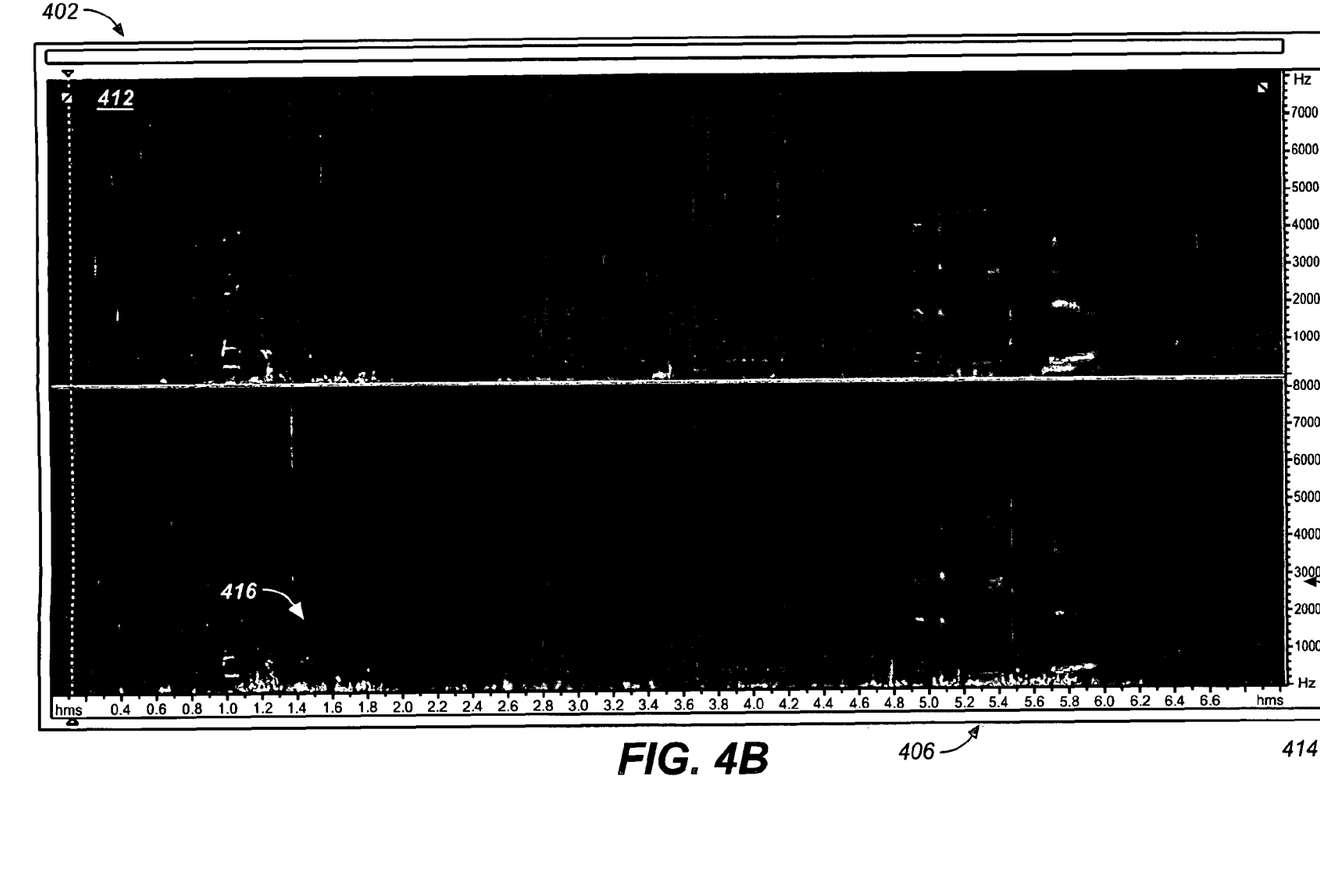
FIG. 4B shows a display of an example frequency spectrogram representation of an audio signal including wind noise.

FIG. 4B shows a display 402 of an example frequency spectrogram 412 representation of an audio signal including wind noise 416. The display 402 shows frequency on the y-axis 414 in Hz and time on the x-axis 406 in seconds. The frequency spectrogram 412 shows spectral lines indicating the frequency of audio data with respect to time. In particular the spectral lines include lines corresponding to wind noise 416. The wind noise 416 is shown by spectral lines representing low frequency audio data in the audio signal.

Figure 5A:
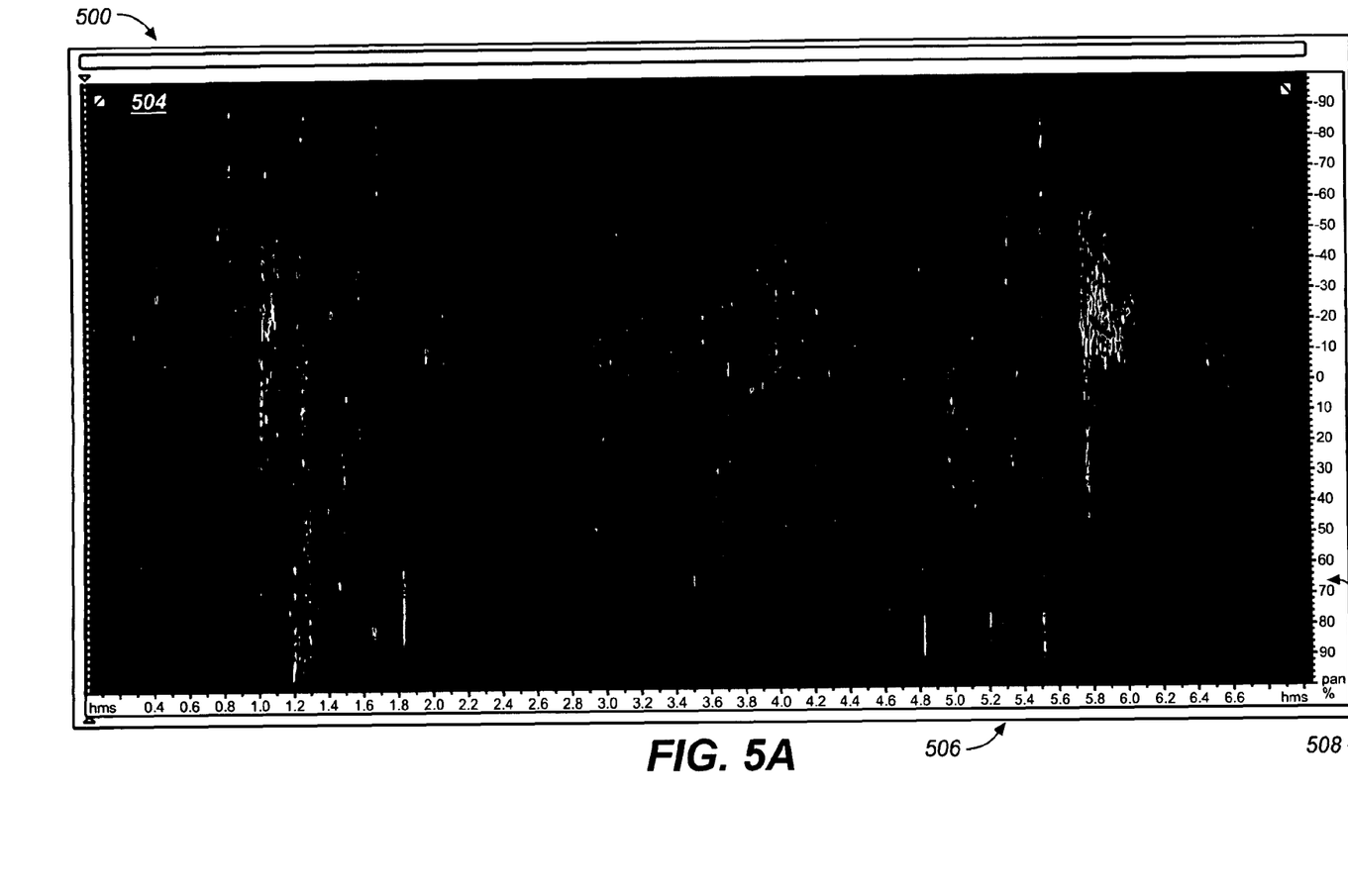
FIG. 5A shows a display of an example pan position representation of an edited audio signal after attenuating wind noise.

FIG. 5A shows a display 500 of an example pan position representation 504 of an edited audio signal after attenuating wind noise. The display 500, similar to display 400 of FIG. 4A, shows pan position on the y-axis 508 as a percentage to the left or right of center and time on the x-axis 506 in seconds. The pan position representation 504 shows the spatial location of audio data within the audio signal relative to a center point. However, the audio data represented in the pan position representation 504 has been edited such that the wind noise 410 of FIG. 4A is no longer prominently indicated at the far right panning, indicating the removal or reduction of the wind noise as compared with the pan position representation 404 of FIG. 4A.

Figure 5B:
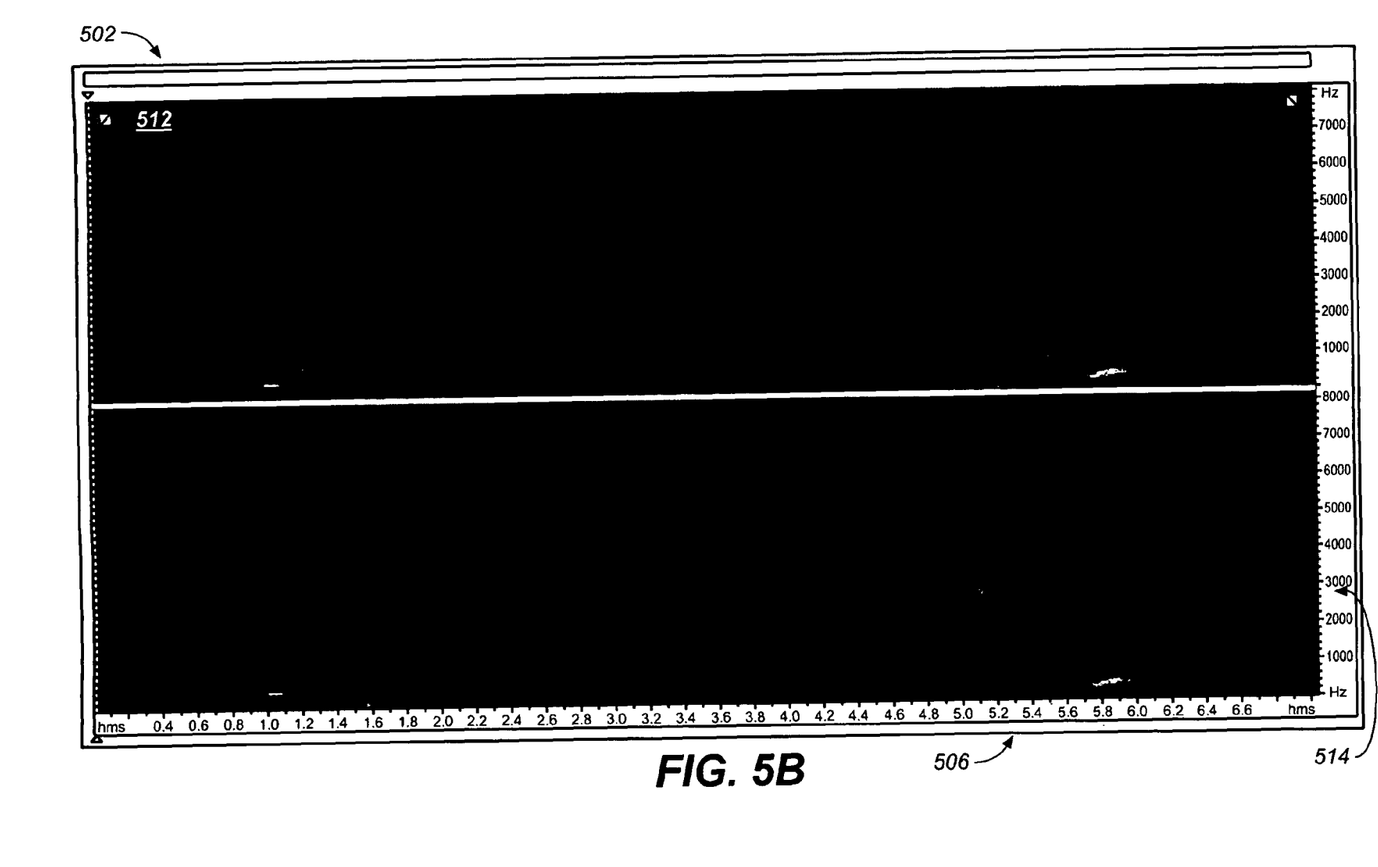
FIG. 5B shows a display of an example frequency spectrogram representation of an edited audio signal after attenuating wind noise.

FIG. 5B shows a display 502 of an example frequency spectrogram 512 representation of an edited audio signal after attenuating wind noise. The display 502, similar to display 402 of FIG. 4B, shows frequency on the y-axis 514 in Hz and time on the x-axis 506 in seconds. The frequency spectrogram 512 shows spectral lines indicating the frequency of audio data with respect to time. In contrast to the frequency spectrogram 412 of FIG. 4B, however, the frequency spectrogram 512 has been edited to remove wind noise such that the frequency spectrogram 512 identifies less low frequency audio data (e.g., having frequencies less than 1000 Hz) compared with frequency spectrogram 412.

In some implementations, wind noise can be detected and attenuated during the audio capture or live streaming of the audio signal. For example, the detection and attenuation can be incorporated into a variety of systems, for example, portable recording devices or large microphone array installation. The wind noise detection and attenuation can be performed on an embedded chip and incorporated into a variety of audio processing devices.

Figure 6:
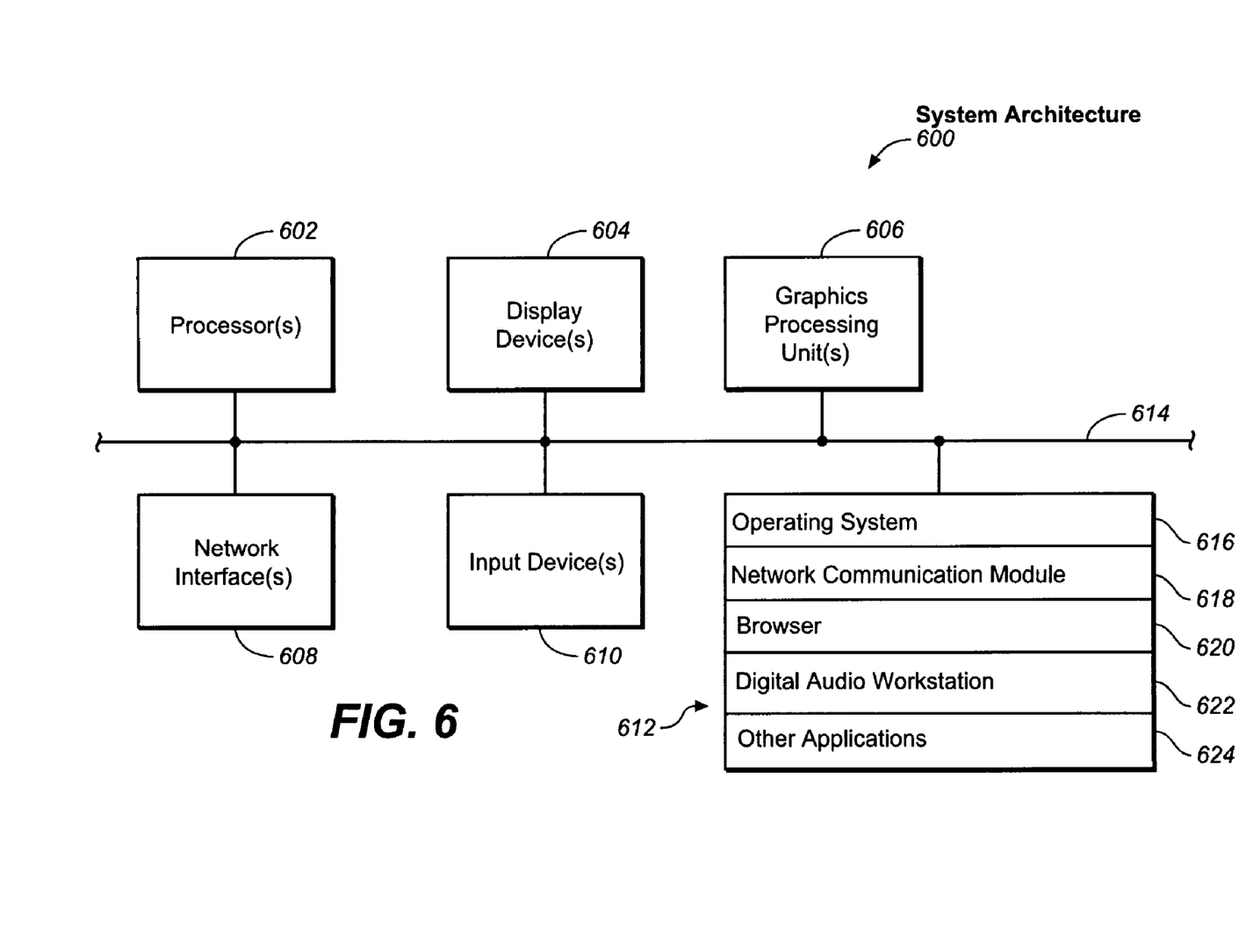
FIG. 6 is a block diagram of an exemplary user system architecture.

FIG. 6 is a block diagram of an exemplary user system architecture 600. The system architecture 600 is capable of hosting a audio processing application that can electronically receive, display, and edit one or more audio signals. The architecture 600 includes one or more processors 602 (e.g., IBM PowerPC, Intel Pentium 4, etc.), one or more display devices 604 (e.g., CRT, LCD), graphics processing units 606

(e.g., NVIDIA GeForce, etc.), a network interface 608 (e.g., Ethernet, FireWire, USB, etc.), input devices 610 (e.g., keyboard, mouse, etc.), and one or more computer-readable mediums 612. These components exchange communications and data using one or more buses 614 (e.g., EISA, PCI, PCI Express, etc.).

The term "computer-readable medium" refers to any medium that participates in providing instructions to a processor 602 for execution. The computer-readable medium 612 further includes an operating system 616 (e.g., Mac OS®, Windows®, Linux, etc.), a network communication module 618, a browser 620 (e.g., Safari®, Microsoft® Internet Explorer, Netscape®, etc.), a digital audio workstation 622, and other applications 624.

The operating system 616 can be multi-user, multiprocessing, multitasking, multithreading, real-time and the like. The operating system 616 performs basic tasks, including but not limited to: recognizing input from input devices 610; sending output to display devices 604; keeping track of files and directories on computer-readable mediums 612 (e.g., memory or a storage device); controlling peripheral devices (e.g., disk drives, printers, etc.); and managing traffic on the one or more buses 614. The network communications module 618 includes various components for establishing and maintaining network connections (e.g., software for implementing communication protocols, such as TCP/IP, HTTP, Ethernet, etc.). The browser 620 enables the user to search a network (e.g., Internet) for information (e.g., digital media items).

The digital audio workstation 622 provides various software components for performing the various functions for identifying wind noise in an audio signal and attenuating audio data in frequency bands identified as containing wind noise as described with respect to FIGS. 1-5.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   receiving an audio signal including audio data in multiple channels;
   identifying noise in the audio signal including identifying panning information for the audio data in the signal at each of a plurality of frequency bands, wherein the panning information includes a panning percentage of each of the plurality of frequency bands;
   determining that the panning percentage of one or more frequency bands exceeds a specified threshold; and
   attenuating the audio data at the one or more frequency bands to generate an edited audio signal in response to determining that the panning percentage of the one or more frequency bands exceeds the specified threshold.

2. The method of claim 1, where identifying the noise includes identifying noise for each of a plurality of segments of the audio signal.

3. The method of claim 2, further comprising, for each segment:
   dividing the audio data of the audio signal into the plurality of frequency bands;
   calculating the panning percentage for each frequency band based on a measured intensity of the audio data in the frequency band for each channel of the multiple channels; and
   filtering the audio data of the segment.

4. The method of claim 3, where the filtering includes determining filter parameters for each segment that attenuates frequency bands having the panning percentage that exceeds the specified threshold and applying the filter to the audio data.

5. The method of claim 2, where the plurality of segments are partially overlapping in the time-domain.

6. The method of claim 1, where the multiple channels includes a left audio channel and a right audio channel providing a stereo audio signal.

7. The method of claim 1, where the identified noise is wind noise.

8. The method of claim 1, where the plurality of frequency bands are frequency bands having frequencies less than or equal to a corner frequency.

9. The method of claim 1, where attenuating the audio data at a particular frequency band includes smoothing attenuation at the boundaries of the particular frequency band.

10. The method of claim 1, further comprising:
    displaying a visual representation of the audio signal; and
    receiving an input selecting a portion of the visual representation corresponding to audio data to edit.

11. The method of claim 1, further comprising:
    storing the edited audio signal.

12. The method of claim 1, where the edited audio signal is generated as the audio signal is being received from an audio capture device.

13. A computer program product, encoded on a computer-readable medium, operable to cause data processing apparatus to perform operations comprising:
    receiving an audio signal including audio data in multiple channels;
    identifying noise in the audio signal including identifying panning information for the audio data in the signal at each of a plurality of frequency bands, wherein the panning information includes a panning percentage of each of the plurality of frequency bands;
    determining that the panning percentage of one or more frequency bands exceeds a specified threshold; and
    attenuating the audio data at the one or more frequency bands to generate an edited audio signal in response to determining that the panning percentage of the one or more frequency bands exceeds the specified threshold.

14. The computer program product of claim 13, where identifying the noise includes identifying noise for each of a plurality of segments of the audio signal.

15. The computer program product of claim 14, further operable to perform operations comprising, for each segment:
    dividing the audio data of the audio signal into the plurality of frequency bands;
    calculating the panning percentage for each frequency band based on a measured intensity of the audio data in the frequency band for each channel of the multiple channels; and
    filtering the audio data of the segment.

16. The computer program product of claim 15, where the filtering includes determining filter parameters for each segment that attenuates frequency bands having the panning percentage that exceeds the specified threshold and applying the filter to the audio data.

17. The computer program product of claim 14, where the plurality of segments are partially overlapping in the time-domain.

18. The computer program product of claim 13, where the multiple channels includes a left audio channel and a right audio channel providing a stereo audio signal.

19. The computer program product of claim 13, where the identified noise is wind noise.

20. The computer program product of claim 13, where the plurality of frequency bands are frequency bands having frequencies less than or equal to a corner frequency.

21. The computer program product of claim 13, where attenuating the audio data at a particular frequency band includes smoothing attenuation at the boundaries of the particular frequency band.

22. The computer program product of claim 13, further operable to perform operations comprising:
  displaying a visual representation of the audio signal; and
  receiving an input selecting a portion of the visual representation corresponding to audio data to edit.

23. The computer program product of claim 13, further operable to perform operations comprising:
  storing the edited audio signal.

24. The computer program product of claim 13, where the edited audio signal is generated as the audio signal is being received from an audio capture device.

25. A system comprising:
  a user interface device; and
  one or more computers operable to interact with the user interface device and to perform operations including:
    receiving an audio signal including audio data in multiple channels;
    identifying noise in the audio signal including identifying panning information for the audio data in the signal at each of a plurality of frequency bands, wherein the panning information includes a panning percentage of each of the plurality of frequency bands;
    determining that the panning percentage of one or more frequency bands exceeds a specified threshold; and
    attenuating the audio data at the one or more frequency bands to generate an edited audio signal in response to determining that the panning percentage of the one or more frequency bands exceeds the specified threshold.

26. The system of claim 25, where identifying the noise includes identifying noise for each of a plurality of segments of the audio signal.

27. The system of claim 26, further comprising, for each segment:
  dividing the audio data of the audio signal into the plurality of frequency bands;
  calculating the panning percentage for each frequency band based on a measured intensity of the audio data in the frequency band for each channel of the multiple channels; and
  filtering the audio data of the segment.

28. The system of claim 27, where the filtering includes determining filter parameters for each segment that attenuates frequency bands having the panning percentage that exceeds the specified threshold and applying the filter to the audio data.

29. The system of claim 26, where the plurality of segments are partially overlapping in the time-domain.

30. The system of claim 25, where the multiple channels includes a left audio channel and a right audio channel providing a stereo audio signal.

31. The system of claim 25, where the identified noise is wind noise.

32. The system of claim 25, where the plurality of frequency bands are frequency bands having frequencies less than or equal to a corner frequency.

33. The system of claim 25, where attenuating the audio data at a particular frequency band includes smoothing attenuation at the boundaries of the particular frequency band.

34. The system of claim 25, further operable to perform operations comprising:
  displaying a visual representation of the audio signal; and
  receiving an input selecting a portion of the visual representation corresponding to audio data to edit.

35. The system of claim 25, further operable to perform operations comprising:
  storing the edited audio signal.

36. The system of claim 25, where the edited audio signal is generated as the audio signal is being received from an audio capture device.

* * * * *